(No Model.)
E. VEDDER.
ORNAMENT OF GLASS FOR WINDOWS, SCREENS, &c.
No. 257,417. Patented May 2, 1882.
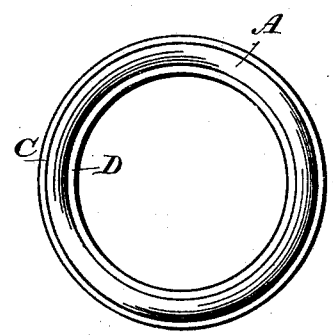
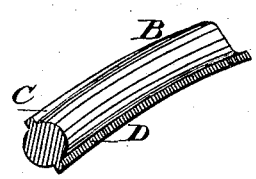
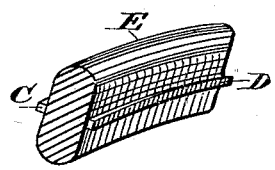
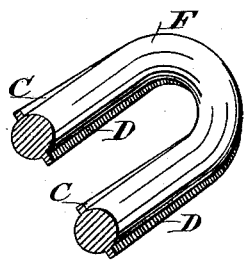
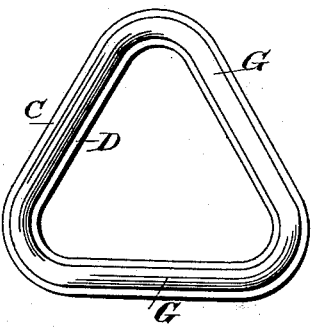
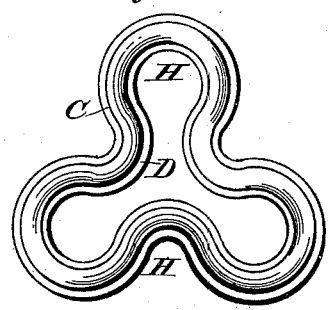
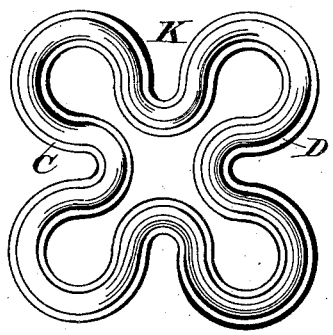
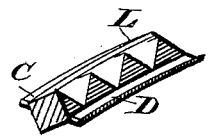
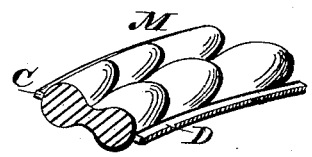
WITNESSES:
T. C. Brecht
A. H. Betz
INVENTOR
Elihu Vedder,
BY Boyd Eliot
ATTORNEY

UNITED STATES PATENT OFFICE.

ELIHU VEDDER, OF NEW YORK, N. Y.

ORNAMENT OF GLASS FOR WINDOWS, SCREENS, &c.

SPECIFICATION forming part of Letters Patent No. 257,417, dated May 2, 1882.

Application filed December 19, 1881. (No model.)

*To all whom it may concern:*

Be it known that I, ELIHU VEDDER, residing in the city, county, and State of New York, have invented certain Improvements in Ornaments of Glass for Windows, Screens, &c., of which the following is a specification.

This invention pertains to the construction of glass ornaments of various colors for use in the construction of windows or screens in combination with plain, ground, or stained glass; and the invention consists chiefly in forming the ornaments of continuous rings or open figures of glass of any desired shape and color, and with flanges externally and internally, the flanges being parallel to the plane of the figure in such a manner that said rings or figures may be readily fastened by the same kind of clamps that are used for fastening plates of stained glass in windows, the object being to combine said molded or pressed open figures of variable thickness and color with plates of plain or stained glass in the construction of windows, as will hereinafter appear.

The drawings represent various forms of figures, in which Figure 1 is a plan of a plain ring with flanges internally and externally; Fig. 2, a section in perspective of a similar ring. Fig. 3 is another section in perspective of a different shape; Fig. 4, a section of link in perspective; Fig. 5, plan of a triangular-shaped figure; Fig. 6, an open figure with three loops; Fig. 7, an open figure with four loops; Fig. 8, a section in perspective of a bar ornamented on its angles, not flanged; and Fig. 9 is a section in perspective of another ornamented rib, which may be caused to form a closed figure.

A is a plain ring, a section of which is shown at B, both of which represent the external and internal flange at C and D to receive the clamps by which they are fastened in the window, as in the present well-known method of clamping plates of glass by metal clamps around the margin of the plate; but if a figure of any considerable thickness of metal were to be used, as in the case of a ring, as shown at A, it would be impossible to fasten it firmly in the window by clamps without concealing or covering a considerable portion of its surface, and if the figure were made as shown in section at E, it would be practically impossible to hold such a piece and have any beneficial effect from its coloring properties. Consequently I propose to form flanges on the exterior and interior of such figures, so that they may be fastened in position along with the plain plates, and in the present well-known manner, while at the same time none of their coloring effect is diminished.

A portion of an oval-shaped ring is shown at F, a triangular figure at G, varied in form at H, and a quadrangular figure at K. They may also be formed with various kinds of ornamentations on their sides, as represented at L and M, to vary the effects of the light in passing through the same kind of substance.

I therefore claim—

As ornaments for windows or screens, rings of glass or equivalent open figures, provided with flanges externally and internally to receive the clamping devices for holding them in position, as hereinbefore set forth.

In witness whereof I have hereunto subscribed my name and affixed my seal in the presence of two subscribing witnesses.

ELIHU VEDDER. [L. S.]

Witnesses:
EUGENE N. ELIOT,
JONATHAN OGDEN.